(12) United States Patent
Burgardt et al.

(10) Patent No.: US 8,544,355 B2
(45) Date of Patent: Oct. 1, 2013

(54) PARKING LOCK ARRANGEMENT

(75) Inventors: Georg Burgardt, Bretzfeld (DE); Stefan Kapp, Walheim (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 832 days.

(21) Appl. No.: 12/201,934

(22) Filed: Aug. 29, 2008

(65) Prior Publication Data

US 2009/0193931 A1 Aug. 6, 2009

(30) Foreign Application Priority Data

Feb. 1, 2008 (DE) .................... 20 2008 001 760 U

(51) Int. Cl.
*F16H 57/10* (2006.01)
*B60W 10/18* (2012.01)
*B60T 1/00* (2006.01)

(52) U.S. Cl.
USPC ........ 74/411.5; 74/577 S; 192/219.5; 188/31; 188/69

(58) Field of Classification Search
USPC ................ 74/577 S, 411.5, 337.5, 473.19, 74/473.21, 473.1, 535, 534; 192/219.5, 219.4; 188/69, 31
See application file for complete search history.

(56) References Cited

U.S. PATENT DOCUMENTS 3,703,941 A * 11/1972 Ohie et al. ............... 188/31
6,978,857 B2 * 12/2005 Korenjak ............... 180/292

FOREIGN PATENT DOCUMENTS

DE 103 10 977 A1 9/2004

* cited by examiner

*Primary Examiner* — Phillip A Johnson
*Assistant Examiner* — Daniel Yabut
(74) *Attorney, Agent, or Firm* — Knobbe Martens Olson & Bear LLP

(57) ABSTRACT

A parking lock arrangement for a motor vehicle gearbox. A parking lock cog can be fixed to a shaft of the motor vehicle gearbox rotatable about a first axis. A parking lock pawl is supported so that it can pivot about a second axis. An actuating mechanism can pivot the parking lock pawl into a locking position, in which the parking lock pawl meshes with the parking lock cog. A release mechanism can pivot the parking lock pawl out of the locking position into a release position, in which the parking lock pawl is decoupled from the parking lock cog. The actuating mechanism has a cam, which is supported so that it can pivot about a third axis and which in a first cam position holds the parking lock pawl in the locking position.

13 Claims, 1 Drawing Sheet

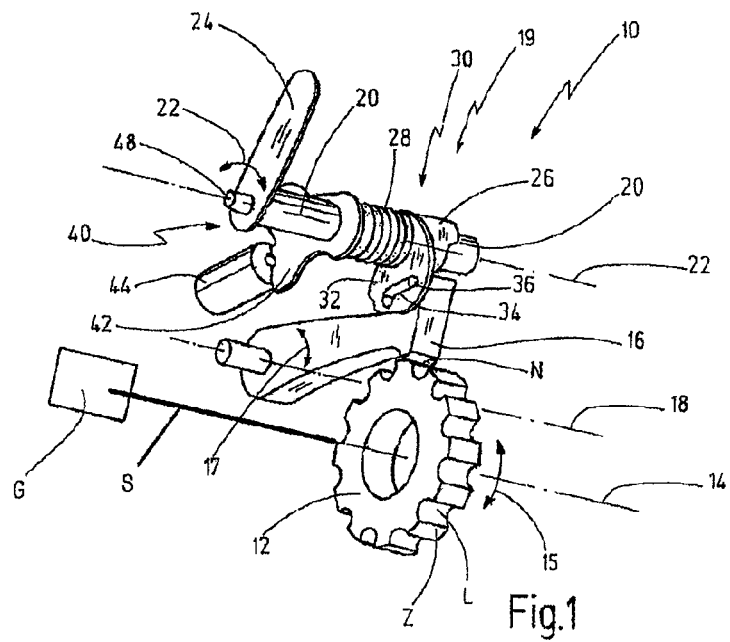
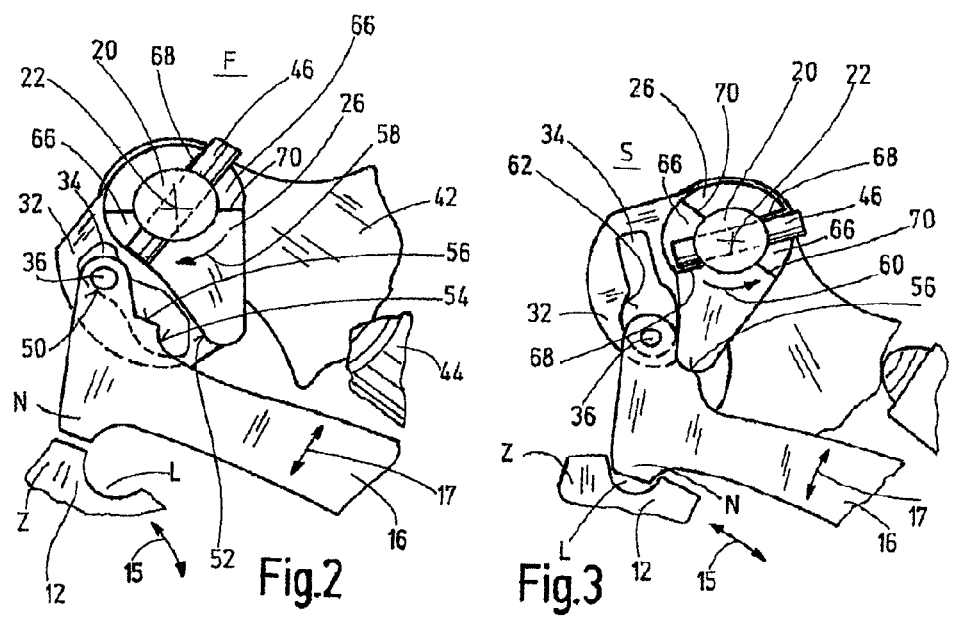

PARKING LOCK ARRANGEMENT

CROSS REFERENCE TO RELATED APPLICATIONS

This application claims the priority of German utility application DE 20 2008 001 760.1, filed Feb. 1, 2008.

BACKGROUND OF THE INVENTION

The present invention relates to a parking lock arrangement for a motor vehicle gearbox, with a parking lock cog, which can be fixed to a shaft of the motor vehicle gearbox rotatable about a first axis, a parking lock pawl, which is supported so that it can pivot about a second axis, an actuating mechanism, by means of which the parking lock pawl can be pivoted into a locking position, in which the parking lock pawl meshes with the parking lock cog, and a release mechanism, by means of which the parking lock pawl can be pivoted out of the locking position into a release position, in which the parking lock pawl is decoupled from the parking lock cog.

Such parking lock arrangements are generally known, being disclosed by DE 103 10 977 A1, for example.

As actuating mechanism, the parking lock disclosed by this document has a sliding key, which can be pushed in an axial direction between a housing wall and the rear side of the parking lock pawl for locking the parking lock arrangement. As release mechanism a spring is provided, which biases the parking lock pawl towards the release position.

The known parking lock arrangement has a relatively large number of components and takes up a relatively large amount of space. Should the spring biasing the parking lock pawl break, the parking lock pawl drops onto the parking lock cog, so that it is necessary to rebuild the gearbox. Such springs furthermore have relatively large tolerances, which can have an adverse effect on the tolerance governing the speed with which the parking lock engages. Added to this is the fact that the spring has to be designed so that the parking lock pawl does not accidentally slip from the release position into the locking position or come in contact with the parking lock cog under accelerations of the gearbox. Such accelerations can occur when running over potholes etc., for example. Since the spring has therefore to be provided with a relatively high spring constant, in order to prevent noise and excessive wear, this means that relatively large forces are required for the actuating mechanism.

BRIEF SUMMARY OF THE INVENTION

In this context, the object of the invention is to specify an improved parking lock arrangement.

In the aforementioned parking lock arrangement, according to a first aspect of the present invention this object is achieved in that the actuating mechanism has a cam, which is supported so that it can pivot about a third axis and which in a first cam position holds the parking lock pawl in the locking position.

Instead of the relatively intricate sliding key arrangement it is consequently proposed to provide a cam, which has a section formed eccentrically in relation to third axis and which can be used in order to press the parking lock pawl out of the release position into the locking position. The cam may here act on the rear side of the parking lock pawl, for example, that is to say a side which is situated opposite a projection on the parking lock pawl, which in the locking position engages in tooth gaps on the parking lock cog.

The expedient of designing the parking lock arrangement so that it is shifted into the locking position by a cam means that actuation can be achieved by a comparatively simple pivoting movement about the third axis. This serves to simplify the overall actuating mechanism.

The object is therefore achieved in full.

According to a preferred embodiment the third axis is aligned parallel to the second axis or askew at least within an angle range of ±45° thereto.

This is a simple design means for achieving cam engagement on the parking lock pawl.

It is further preferred if the second axis is aligned parallel to the first axis or askew at least within an angle range of ±45° thereto.

The term parallel is therefore to be interpreted broadly here. In the arrangement of the three axes a precisely parallel alignment is not what matters, although this is generally preferred for production engineering reasons. Even a skewed position in angle ranges up to 45° will still generally allow reasonable functioning in a possibly simpler design, depending on the conditions of installation.

Overall, it is furthermore advantageous if the cam is arranged on an actuating shaft, which can be turned by means of an actuating member.

The actuating shaft may exercise a number of functions here, as will be explained in more detail below.

It is advantageous, for example, if the cam is supported so that it can turn, at least to a limited extent, on the actuating shaft.

This affords scope for further functions.

For example, it is possible to connect the cam to the actuating shaft by way of a spring.

In this embodiment it is possible to actuate the parking lock arrangement also in a position in which a projection of the parking lock pawl is aligned with a tooth of the parking lock cog. As the parking lock cog turns further, the parking lock pawl is then pressed into a tooth gap in the parking lock cog by the energy stored in the spring, in order to set the locking position.

It is particularly advantageous, for example, if the spring is embodied as a torsion spring, which is arranged around the actuating shaft.

This gives a compact construction. This moreover makes the parking lock arrangement easy to assemble.

It is especially advantageous here if the actuating shaft has a fitting stop at one end, against which the cam and at least one torsion spring are fitted in an axial direction.

In this embodiment the parking lock arrangement can be at least partially preassembled by pushing the cam and the torsion spring (and possibly other components) onto the actuating shaft in an axial direction.

According to a further preferred embodiment the release mechanism has a guide device for the parking lock pawl, on which the parking lock pawl is positively guided, at least in sections.

This embodiment is to be regarded as an invention in itself, regardless of the design of the actuating mechanism.

The core idea of this invention is to return the parking lock pawl from the locking position into the release position through positive guidance, making it possible to dispense with a separate spring for this function. The disadvantages of such a return spring, referred to in the introduction can thereby be avoided. The parking lock arrangement can be designed with a greater overall functional reliability. Any wear can moreover be reduced.

Accordingly the parking lock pawl is preferably positively guided against the guide device, at least in the direction of a pivoting movement from the locking position into the release position.

According to a further preferred embodiment the parking lock pawl in the release position is held against the guide device, so that a positive interlock is established between the guide device and the parking lock pawl in the direction of the locking position.

This measure serves to prevent the parking lock pawl accidentally dropping into the locking position under accelerations of the gearbox (as when running over potholes, for example). Wear to the parking lock arrangement can therefore be minimized.

The guide device is furthermore advantageously arranged on the actuating shaft.

As a result the guide device can be displaced (in particular turned) comparatively easily, in order to transfer the parking lock pawl into the release position.

It goes without saying that the guide device is in this case preferably arranged on the same actuating shaft as the cam of the actuating mechanism.

It is furthermore advantageous if the guide device has a guide section formed eccentrically about the third axis.

This allows the parking lock pawl to be positively guided in a way functionally comparable to the working of the cam of the actuating mechanism.

This affords synergistic effects, since the guide device can be similarly pre-fitted to the actuating shaft, for example.

It is particularly advantageous, however, if the guide device is integrally formed with the cam, but is at least rigidly connected to the cam.

This measure serves to reduce the number of components still further.

According to an altogether preferred embodiment the parking lock pawl has a drive member which extends in a direction parallel to the second axis.

This also allows an effective design solution for the release mechanism.

It is particularly advantageous here if the drive member is embodied as a pin, which extends from the parking lock pawl parallel to the second axis.

Such a pin may be integrally formed with the parking lock pawl, but may also be inserted into and fixed in a prepared hole in the parking lock pawl, for example.

It is furthermore advantageous if the guide device has a recess, in which a drive member of the parking lock pawl is guided.

For one thing, the provision of such a recess affords an effective design solution for the guide device. In its design the guide device may furthermore be beneficially integrated with the cam.

According to a further preferred embodiment the recess is here formed as a closed recess.

This measure serves to prevent the drive member accidentally detaching itself from the recess.

According to a further preferred embodiment a detent device is also fixed to the actuating mechanism. This allows the locking position and the release position to be maintained even when no actuating force is being exerted on the actuating mechanism and/or the release mechanism. The parking lock arrangement can consequently be of self-holding design.

The features specified above and yet to be explained below can obviously be used not only in the respective combination specified but also in other combinations or alone, without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing:

FIG. 1 shows a perspective view of one embodiment of a parking lock arrangement according to the invention;

FIG. 2 shows an axial view of the parking lock arrangement in FIG. 1 in a release position; and FIG. 3 shows an axial view of the parking lock arrangement in FIG. 1 in a locking position.

DETAILED DESCRIPTION OF THE INVENTION

FIG. 1 in schematic form represents a gearbox G, to which a parking lock arrangement, generally denoted by 10, is assigned.

The parking lock arrangement 10 has a parking lock cog 12, which in the manner of a spur gear comprises teeth Z and tooth gaps L on its outer circumference. The parking lock cog 12 is rotatable about a first axis 14, as is represented by the numeral 15.

The parking lock arrangement 10 furthermore has parking lock pawl 16, which is capable of pivoting about a second axis 18, as is indicated by 17. The second axis 18 runs at a distance from the first axis 14 approximately parallel thereto.

The parking lock arrangement 10 further comprises an actuating mechanism 19, by means of which the parking lock pawl 16 can be pivoted from a release position into a locking position. In the locking position a projection N provided at the outer end of the parking lock pawl 16 engages in a tooth gap L in the parking lock cog 12. The parking lock pawl 16 is here preferably fixed to the housing, so that in the locking position any turning of the parking lock cog 12 is prevented. Accordingly any turning of a shaft S of the gearbox G connected to the parking lock cog 12 is also prevented and a parking lock position is therefore established.

The actuating mechanism 19 has a shaft 20, which is rotatable about a third axis 22, as is indicated by 23. The third axis 22 runs approximately parallel to the first axis 14 and to the second axis 18 and is arranged at a distance from these two axes.

Fixed to the actuating shaft 20 is an actuating member 24 in the form of a lever, to which an actuator (not shown) and/or parking lock switch mechanism can be fixed.

A cam 26 is also arranged on the actuating shaft 20. The cam 26 is to a limited extent rotatable in relation to the actuating shaft 20 and is connected to the actuating shaft 20 by way of a torsion spring 28. The function of the torsion spring 28 is to act as an energy storage device, when the actuating member 24 is turned in order to set the locking position, but the projection N on the parking lock pawl 16 is situated radially outside a tooth Z at this time. In this state a positive interlock cannot be established in a circumferential direction between the parking lock pawl 16 and the parking lock cog 12. The energy stored in the torsion spring 28 is used to establish the locking position, as soon as the parking lock cog 12 is turned further, so that the projection N can engage in a tooth gap L.

The parking lock arrangement 10 furthermore has a release mechanism 30, which serves to transfer the parking lock pawl 16 from the locking position into a release position, in which the projection N is not engaged in a tooth gap L, and the parking lock cog 12 is therefore free to turn in relation to the parking lock pawl 16.

The release mechanism 30 is designed without its own spring and comprises a guide device in the form of an eccentric disk 32, which is fixed to the actuating shaft 20.

The eccentric disk 32 comprises a recess 34, which is formed on the eccentric disk 32 in an axial direction. An axially projecting pin 36, which engages in the recess 34 in all working positions of the parking lock pawl 16, is formed on the parking lock pawl 16. The recess 34 is formed so that in the locking position the pin 36 does not touch the inner circumference of the closed recess 34. If the parking lock pawl 16 is to be transferred into the release position, the actuating shaft 20 is correspondingly turned. In so doing a section of the inner circumference of the recess 34 acts on the pin 36 and due to the eccentric arrangement of the recess 34 pulls the pin 36 and consequently the parking lock pawl 16 into the release position. The parking lock pawl 16 is here positively guided, at least in sections. In the release position a positive interlock is furthermore established between the pin 36 and the recess 34 in the direction of the locking position, so that an accidental deflection of the parking lock pawl 16 in the direction of the locking position is positively prevented.

The eccentric disk 32 may be formed separately from the cam 26, but is preferably integrally formed with the latter.

The parking lock arrangement 10 furthermore has a detent device 40, by means of which the actuating shaft 20 can be engaged at least in the positions corresponding to the locking position and the release position. As a result, it is not necessary in these positions to exert a retaining action on the actuating shaft 20 via the actuating member 24.

The detent device 40 has a detent cam 42, which is fixed to the actuating shaft 20 and which has a detent contour on its radially outer side. The detent device 40 further comprises an arresting bush 44 with an arresting member, which engages in corresponding recesses of the detent contour on the detent cam 42, in each of the suitable positions.

In FIGS. 2 and 3 the parking lock arrangement shown in FIG. 1 is shown in an axial top view in a release position F and in a locking position S respectively.

It will be seen from FIGS. 2 and 3 that an assembly pin 46 is fixed to the actuating shaft 20 at one axial end. The assembly pin 46 (or another axial stop) allows the parking lock arrangement 10 to be assembled by pushing the cam 26, the torsion spring 28, the detent cam 42 and the actuating member 24 onto the axial shaft 20 in an axial direction and then fixing them by means of a nut 48 (see FIG. 1). It will be appreciated here that, if necessary, other means may be provided on the actuating shaft 20 in order to prevent any torsion of the detent cam 42 and the actuating member 24, for example, in relation to the actuating shaft 20. Moreover, a part of a sensor arrangement, serving to detect the position of the parking lock arrangement 10 electronically, may also be fixed to the actuating shaft 20.

The fact that the assembly pin 46 is located in immediate proximity to the cam 26 means that through suitable shaping of the axial end face of the cam 26, the cam 26 can also be endowed with a limited facility for angular rotation relative to the actuating shaft 20, as is explained further below.

It can be seen from FIG. 2 that the recess 34 has a retaining section 50, against which the pin 36 bears in the release position F, so that an accidental pivoting of the parking lock pawl 16 into the locking position S is positively prevented.

It can further be seen from FIG. 2 that the cam 26 has an actuating face 52 and that the back of the parking lock pawl 16 has a driving face 54 situated opposite actuating face 52. On its back the parking lock pawl 16 further comprises a contour with a retaining face 56, the function of which will be explained further below.

If the actuating shaft 20, starting from the release position F in FIG. 2, is turned by means of the actuating member 24, the actuating face 52 comes to bear against the driving face 54 of the parking lock pawl 16. In so doing the eccentric action of the cam 26 causes the parking lock pawl 16 to pivot towards the parking lock cog 12. If the projection on the parking lock pawl 16 is situated opposite a tooth Z, as is shown in FIG. 2, the torsion spring 28 will be tensioned under further actuation of the actuating member 24, whilst the cam 26 is for the time being unable to move further.

As soon as the parking lock cog 12 is turned further, the projection N is pressed into a tooth gap L owing to the energy stored in the spring 28. In the process the cam 26 is moved further, as is indicated by 58.

FIG. 3 finally shows the locking position S thus reached. Here a radially outer end of the cam 26 is positioned so that it is located above the retaining face 56 running approximately tangentially to the direction of rotation 15. In this way, even in the locking position S, the cam 26 bears against the parking lock pawl 16, which through a positive interlock prevents the parking lock pawl 16 accidentally pivoting back into the release position F.

If the parking lock arrangement 10 is to be returned to the release position F, the shaft 20 is turned back as is indicated by 60 in FIG. 3.

In so doing the cam 26 first releases the parking lock pawl 16, so that the latter can move towards the release position F. However, the release mechanism 30 does not have a spring serving to press the parking lock pawl 16 back into the release position F. Instead, this function is served by the release mechanism 30 with the recess 34 in the eccentric disk 32. In the locking position S shown in FIG. 3, the pin 36 is not bearing on the inner circumference of the recess 34. As soon as the actuating shaft 20 is turned further in the direction 60, however, a release section 62 on the inner circumference of the recess 34 comes into contact with the pin 36. The release section 62 is here shaped so that the parking lock pawl 16 is drawn back into the release position F shown in FIG. 2.

As already mentioned above, the cam 26 can be turned to a limited extent in relation to the actuating shaft 20. This limited turning facility may be achieved in any way desired. However, the axial end face of the cam 26 facing the assembly pin 46 is preferably formed with axial recesses 66, in which ends of the assembly pin 46, protruding from the actuating shaft 20, engage. The recesses 66 are arranged so that they have bearing faces 68, against which the assembly pin 46 normally bears due to the biasing of the torsion spring 28.

If the actuating member 24 is pivoted, whilst the projection N is situated opposite a tooth Z, the actuating shaft 20 is turned with the assembly pin 46, whereas the cam 26 for the time being remains in its initial position (the actuating face 52 bearing on the driving face 54). In so doing the assembly pin 46 is turned inside the recesses 66 relative to the cam 26, whilst energy is stored in the torsion spring 28. The maximum torsion of the actuating shaft 22 relative to the cam 26 is set by second bearing faces 70, which are formed by the recesses 66. The bearing faces 68, 70 extend at an angle ranging from 10 to 120°, for example, preferably in the range from 20 to 90°. The bearing faces 68, 70 are here preferably aligned radially.

The assembly pin 46 may extend from the actuating shaft 22 in one radial direction. In this case only one recess 66 is needed. As shown, the assembly pin 46 (or another stop member) preferably extends, however, from opposite sides of the actuating shaft 20, so that a recess 66 is provided for each of the projecting ends. High contact pressures between the assembly pin 46 and the bearing faces 68, 70 can thereby be absorbed. High contact pressures may occur especially when the torsion spring 28 is rapidly relaxed.

What is claimed is:

1. A parking lock arrangement for a motor vehicle gearbox, comprising:
    a parking lock cog, which is fixed to a shaft of the motor vehicle gearbox rotatable about a first axis,
    a parking lock pawl, which is supported so that the pawl pivots about a second axis,
    an actuating mechanism, by means of which the parking lock pawl is pivotable into a locking position, in which the parking lock pawl meshes with the parking lock cog, and
    a release mechanism, by means of which the parking lock pawl is pivotable out of the locking position into a release position, in which the parking lock pawl is decoupled from the parking lock cog,
    wherein the actuating mechanism has a cam arranged on an actuating shaft which turns by means of an actuating member, which is supported so that the cam is pivotable about a third axis and which in a first cam position holds the parking lock pawl in the locking position,
    wherein the release mechanism has a guide device for the parking lock pawl arranged on the actuating shaft, the parking lock pawl being positively guided against the guide device at least in the direction of pivoting action from the locking position into the release position,
    wherein the guide device has a recess in which a drive member of the parking lock pawl is positively guided, at least in sections, wherein the cam defines a cam surface that is axially separate from a surface defined by the recess with respect to the actuating shaft, and wherein in the locking position the parking lock pawl is held against the separate cam surface so that a positive interlock is established between the separate cam surface and the parking lock pawl.

2. A parking lock arrangement according to claim 1, wherein the third axis is aligned parallel to the second axis.

3. A parking lock arrangement according to claim 1, wherein the second axis is aligned parallel to the first axis.

4. A parking lock arrangement according to claim 1, wherein the cam is supported so that the cam turns, at least to a limited extent, on the actuating shaft.

5. A parking lock arrangement according to claim 4, wherein the cam is connected to the actuating shaft by way of a spring.

6. A parking lock arrangement according to claim 5, wherein the spring is embodied as a torsion spring, which is arranged around the actuating shaft.

7. A parking lock arrangement according to claim 1, wherein the actuating shaft has a fitting stop at one end, against which the cam and at least one torsion spring are fitted in an axial direction.

8. A parking lock arrangement according to claim 1, wherein the guide device has a guide section (34, 62) formed eccentrically about the third axis.

9. A parking lock arrangement according to claim 1, wherein the guide device is integrally formed with the cam.

10. A parking lock arrangement according to claim 1, wherein the parking lock pawl has the drive member (36), which extends in a direction parallel to the second axis.

11. A parking lock arrangement according to claim 10, wherein the drive member is embodied as a pin (36), which extends from the parking lock pawl parallel to the second axis.

12. A parking lock arrangement according to claim 1, wherein the recess is embodied as a closed recess.

13. A parking lock arrangement according to claim 1, wherein a detent device is fixed to the actuating mechanism.

* * * * *